V. P. FEDOROFF.
ALARM SIGNAL.
APPLICATION FILED SEPT. 29, 1917.

1,256,542.

Patented Feb. 19, 1918.
7 SHEETS—SHEET 1.

WITNESS
Rich. C. Wegener

INVENTOR.
Vladimir P. Fedoroff.
Oscar Geier
HIS ATTORNEY

V. P. FEDOROFF.
ALARM SIGNAL.
APPLICATION FILED SEPT. 29, 1917.

1,256,542.

Patented Feb. 19, 1918.
7 SHEETS—SHEET 4.

WITNESS
Rich. A. Wegener.

INVENTOR.
Vladimir P. Fedoroff.
BY Oscar Geier
HIS ATTORNEY

V. P. FEDOROFF.
ALARM SIGNAL.
APPLICATION FILED SEPT. 29, 1917.

1,256,542.

Patented Feb. 19, 1918.
7 SHEETS—SHEET 7.

UNITED STATES PATENT OFFICE.

VLADIMIR P. FEDOROFF, OF MERIDEN, CONNECTICUT.

ALARM-SIGNAL.

REISSUED 1,256,542.   Specification of Letters Patent.   Patented Feb. 19, 1918.

Application filed September 29, 1917. Serial No. 193,897.

*To all whom it may concern:*

Be it known that I, VLADIMIR P. FEDOROFF, a subject of the Czar of Russia, resident of Meriden, county of New Haven, and State of Connecticut, have invented certain new and useful Improvements in Alarm-Signals, of which the following is a specification.

This invention relates to improvements in alarm signals, particularly to types used as theft preventing devices, the object of the invention being to arrange an audible alarm so that when it is displaced or tampered with as to cause notification of the same.

A further object is to provide such devices in forms which may be applied to a wide variety of articles in such manner that if the same are disturbed an effective audible signal is given.

A still further object is to provide such devices in forms which are small in compass and readily applied without material change in the article to which they are attached.

These and other like objects are attained by the novel construction and combination of parts hereafter described and shown in the accompanying drawings, forming a material part of this disclosure, and in which—

The implement in the compact form shown is comprised of a base plate 50, the ends 51 of which are extended and formed with openings to receive screws or like securing means whereby the implement may be fastened upon any article it is desired to protect. Rising from the base are end plates, respectively 52 and 53, and arranged parallel with the latter is a partition plate 54, forming a compartment 55, all of the several plates being rigidly secured to the rear side plate 56, which has at the lower portion of the compartment 55 a curved enlargement 60, a similar enlargement 61 being formed in the rigid front plate 62, which covers the compartment 55. The main compartment is provided with a cover 63, secured by the hinges 64, at its lower edge to the base 50, the cover being provided with an actuating knob 65, for manipulation.

Secured to the rear plate 56, at the top is a partial cover having extending edges 68, while over the lesser compartment 55, are disposed parallel plates 69 and 70, having between them a recess 72, which coöperates with the edges 68, in securing a sliding cover 73, having slide grooves formed in the out-turned flanged edges 74, and which will be more fully described later on.

Parallel with the cover plate 73, is a fixed horizontal plate 75, the same extending from end to end in the main compartment, which has at both the lower corners and upper left hand corner, interior lugs 77, suited to receive screws 78, by means of which a removable plate 80, is secured in position. Attached to the plate 80, is a bell 81, rotatable upon the stem 82, actuated by a clock work mechanism, consisting of a spring 84, attached at its inner end to a spindle 85, having a square extending head 86. A folding loop handle 87, is attached in such manner that when extended it can be used for winding the spring, the outer convolution of which is engaged with a gear 88, driving a gear train terminating in the spindle 89, upon which is secured a star wheel 90, adapted to operate the escapement anchor 91, pivoted at 92, and having an operative arm 93, carrying the hammer 94, adapted to make contact with the bell when the escapement is released.

In order to permit sound to issue from the casing, the rear cover plate 56, is provided with a plurality of openings, similar openings 95 being also formed through the end of a cylindrical guard 97, rigidly secured to the exterior of the cover plate 56, the periphery of the guard having openings 98, for a like purpose and which prevents the entrance of objects which might render the bell ineffective.

Slidably and rotatably mounted in the upper right hand portion of the casing is a spindle 100, movable in a boss formed in the end plate 53, the spindle extending outward to the right, and having an operating head 101; a notched disk 102 is secured on the spindle and has on it a plurality of characters 103, while engageable with the notches in the disk are projections 104, formed with a rigid extension 105, of the end plate 53.

A portion of the spindle is rotatably engaged within a sleeve 108, having a key 109, the sleeve being slidably engaged within a split bushing 110, rigidly set in the partition 54, having a keyway 111, the bushing being formed with a spring finger 112, adapted to resiliently press against the periphery of the sleeve, acting as a brake thereupon. The inner end of the spindle 100, has secured to it a head 114 by means of a pin, closely adjacent to which is a rotatable disk 115, held in position by the nut 116, through which passes a securing pin 117. The edge of the disk 115, is preferably curved and completely circular except for a recess 118, the purpose of which will be further on explained.

On the inner face of the disk 115, are a plurality of indentations 120, corresponding in number and location with the characters 121, impressed upon the periphery of the head 114 and which also agree in number with the characters 103 on the slotted disk 102.

In order to hold the disk 115, adjusted relatively to the head 114, a plunger 122, is set in a bored opening formed through the head and impelled by the pressure spring 123, the spring permitting the disk to be turned in resetting the combination.

It is readily possible to adjust the disk 115, relatively to the characters placed upon the head and notched disk 102, in the following manner, the plate 80, carrying the bell and its operative mechanism, is provided with an opening 130, registerable with the characters displayed on the head, when the same is in its innermost position, and engageable within the slot or recess 130, is a stop 131, formed with a pivoted detent 132, secured to the plate 80, and held in either of its adjustable positions by means of the flat spring 133, so that the setting of the disk spring 115, may be attained in a convenient manner.

Secured to the sleeve 108, at its outermost end is a collar 135, separated by a space 136, from a revoluble sleeve 138, with which is formed a toothed segment 140, carrying a pin 141, which extends inwardly through an arcuate slot formed in the partition 54, and engages in the open loop 142, of a flat vertical spring 143, secured at its lower end to the plate 54, immediately above the corner block 77, the arrangement of the spring being such that the segment is kept normally in a central vertical position.

The teeth of this segment are engageable with those of the segment 146, formed on the arcuate upper end of a pendulum lever 147, pivoted on the pin 148, pivotally mounted in the outer plate 53, and partition plate 54, while attached to the rod 147, is a weight 150, adapted to swing in the enlargement in the lower right hand portion of the casing. It will be understood that as the upper segment 140, is movable longitudinally with respect to the lower actuating segment 146, that the two segments may be engaged in different relation.

Formed with a sleeve 138 is a lug 151, opposite to the center of the segment 140, and having an arm 152 bent inwardly parallel with the spindle 100. In order to prevent engagement of the segments at an undesirable moment and also to prevent over withdrawal of the spindle 100, a slide block 155, is operatively engaged with a pair of rods 156, which move vertically through a guide 157, rigidly secured to the rods by means of the screws 158, and actuated by the screw 160, having a neck 161, engageable in an opening formed through the plates 69 and 70, above which is a flange 162, and an extending knurled operating knob 163. By rotating the knob the block 155 may be raised or lowered as desired. The rods 156 when in a raised position engage in suitable openings formed in the cover plate 73 thereby preventing it from being opened.

Secured to the front of the cover plate 73, is a bell shaped extension 165, engaged by the sleeve 166, which encircles a metallic chamber 168, having a screw threaded portion 169, engaged in the upper corner lug 77, and which is adapted to contain a cartridge 170, held in an engaged position by a protective plate 171, pivoted on the screw 172, and provided with an extending lug 173 by means of which it may be raised, exposing the cartridge, which is detonated through the opening 174, as follows:—

A transverse partition 175, extends transversely across the space at the upper portion of the casing and is formed with an opening in which is rotatably and slidably received, the round plunger bar 178, formed at its outer end with a recessed head 179, and carrying a front projection 180, adapted to make contact with and detonate the cartridge.

Encircling the plunger 178 is a coiled pressure spring 181, the same extending between the head 179, and the plate 175, and adapted to urge the plunger forward when it is released; also engaged with the head 179, is a downturned projection 182, the same extending through a slot formed in the horizontal partition 75, and engageable with a lever 183, which operates the escapement anchor 91, thereby permitting the alarm bell to be operated.

Secured at the opposite end of the plunger 178, is a plug 185, having an encircling band 186, engaged by a screw 187, the point of which operates within a slot 188, formed in the plug 185, and which limits the rotary motion of the sleeve when motion is communicated by the extending stem 189, provided with a square corrugated knob 190, the screw 187, also secures a spring detent 192, adapted to make contact in an arcuate recess formed in the outer flange 184, of the plug 185, the same pressing tensionally against it so as to prevent it from jarring or shaking loose in an adjusted position.

A squared extension 194, is formed with the plug 185, adapted to pass through an opening in the upper part of the partition plate 54, and between the sides of the channel shaped extension 194, is a detent 195, pivoted on the pin 196, pressed normally outward by the flat spring 197, the inner end of which is rigidly engaged within the plug 185.

Secured to the perforated rear casing plate 56, is a fixed block 200, having a threaded stem 201, upon which is slidably engaged a rectangular bar 202, held by the nut 203, the bar terminating in its forward end in a round stem 204, passing through the corner block 205, secured to the partition 54, the bar, 202, having a lug 206, in which is pivoted a dog 207, pressed normally downward by the spring 208, attached to a lever 210, pivoted in the lugs 212, formed with the bar 202, the lever 210 having a forward extension 214, terminating in a vertical plate-like element 215, the lower front part of which has a beveled edge 216, adapted to contact with the arm 152.

Engaged upon a vertical pivot 220, mounted in the upper right hand part of the casing, adjacent to the partition plate 54, is a dog 221, held normally against the partition by means of a flat pressure spring 222, the end of the dog being adapted to enter a recess in the bar 194, and make contact with the detent 195, when the plunger 178 is drawn to oppose the spring 181, and in order to hold the plunger in its rearward position a plate 224, formed with the dog 221, extends through a slot in the partition 54, toward the right, there being formed on the plate 224, a projection 225, the same being contactable with the end of the plate 215, which is also arranged to engage with the arm 152 when in an operative position.

Formed with the sleeve 186, is a lug 230, adapted to extend through a slot formed longitudinally the plate 75, which is provided with recesses at its ends, the same limiting the movement of the sleeve, the lug extending through the slot and being normally in contact with the upper surface of the lever 110.

Figures 20, 23, 24:
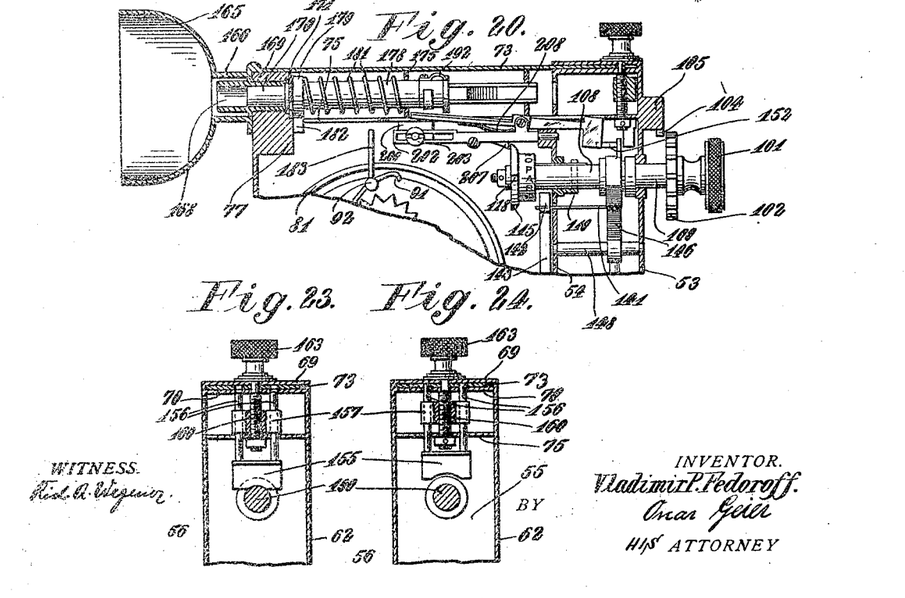
Fig. 20 is a vertical sectional view taken on line 20—20 of Fig. 18.
Fig. 23 is a partial vertical sectional view taken on line 23—23 of Fig. 9.
Fig. 24 is a similar partial sectional view taken on line 24—24 of Fig. 10.
Figures 25, 26:
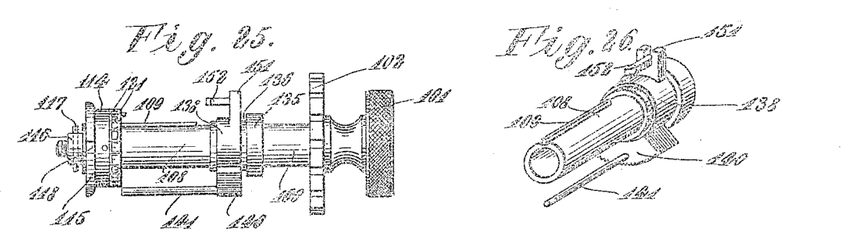
Fig. 25 is an enlarged elevational view of the permutative lock features as used with the signal.
Fig. 26 is a perspective view showing in detail elements of the same.
Figures 27, 28:
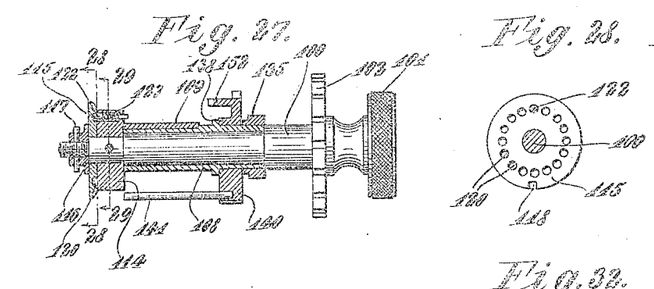
Fig. 27 is a partial elevational and sectional view of the parts shown in Fig. 25.
Fig. 28 is a transverse sectional view taken on line 28—28 of Fig. 27.
Figure 29:
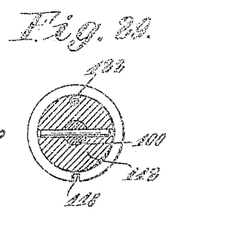
Fig. 29 is a similar sectional view taken on line 29—29 of Fig. 27.
Figure 30:
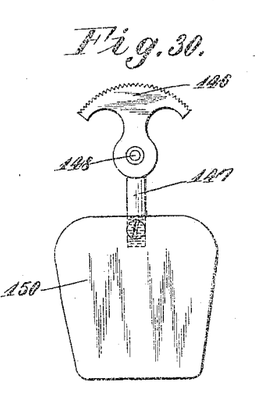
Fig. 30 is a front elevational view of the gravity operating device.
Figure 31:
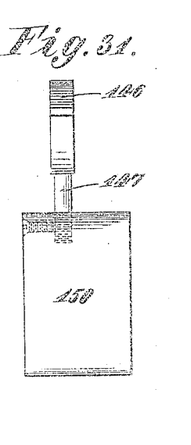
Fig. 31 is a side elevational view of the same.
Figures 32, 33:
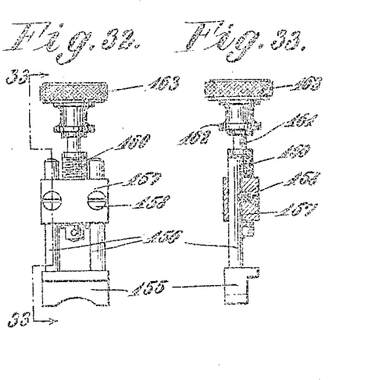
Fig. 32 is a side elevational view of the signal setting means.
Fig. 33 is a sectional view taken on line 33—33 of Fig. 32.
Figures 34, 35, 36, 37, 38, 39, 40, 41, 42:
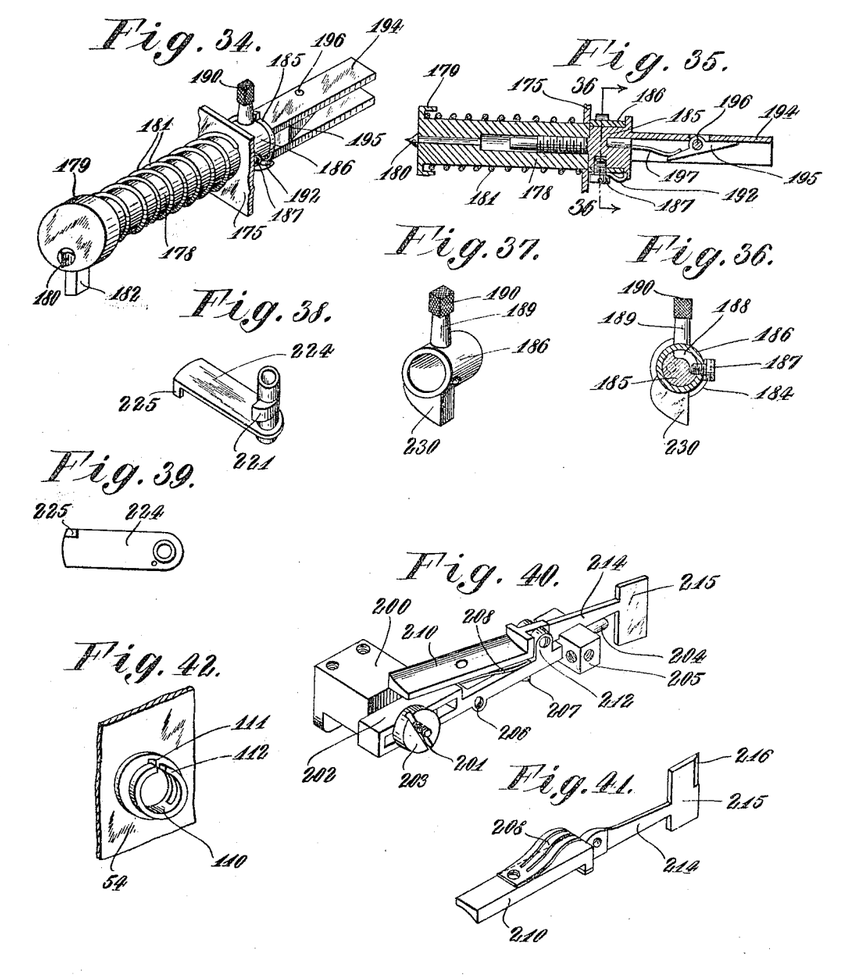
Fig. 34 is a perspective view of the firing bolt and allied mechanisms.
Fig. 35 is a longitudinal sectional view of the same.
Fig. 36 is a transverse sectional view taken on line 36—36 of Fig. 35.
Fig. 37 is a perspective view of a detail used in connection therewith.
Fig. 38 is another perspective view showing another detail.
Fig. 39 is a bottom plane view of the element shown in Fig. 38.
Fig. 40 is an enlarged perspective detail view of operative details.
Fig. 41 is a perspective view of the principal element shown in Fig. 40.
Fig. 42 is another fragmental perspective view showing structural details.

In operation, the parts being in the position shown in Fig. 20, and it being desired to reset the devices, the bell actuating the mechanism is wound, the outer hinged cover 63, being dropped and the cover plate 73 removed, the post 190, extending upward from the sleeve 186, turned up and pushed toward the right, so far as it will go, this action compresses the spring 181, and the dog 221, engaging with the detent 195, holds the plunger 178.

The plate 171 is raised a cartridge inserted in the chamber 168 and the cover plate replaced, the post is then turned horizontally, and the cover plate 73 applied, and locked by actuating the knob 163.

Figure 1:
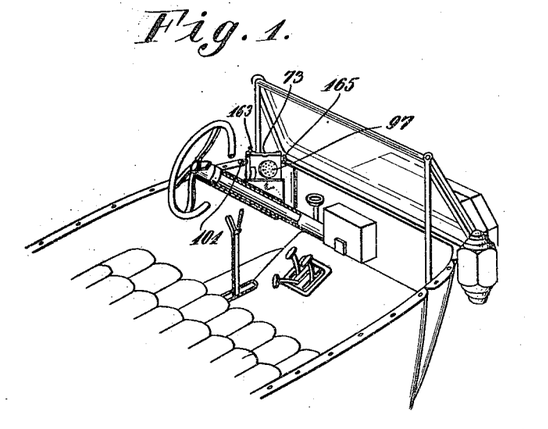
Figure 1 is a perspective view showing the upper front portion of an automobile and indicating the application of the invention.
Figure 2:
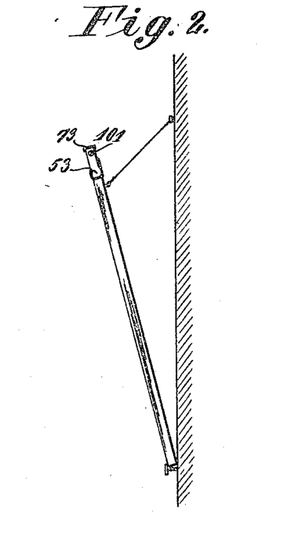
Fig. 2 is an edge elevational view showing a conventional type of picture frame, as attached to a wall, and the disposition of the signal alarm connected therewith.
Figure 3:
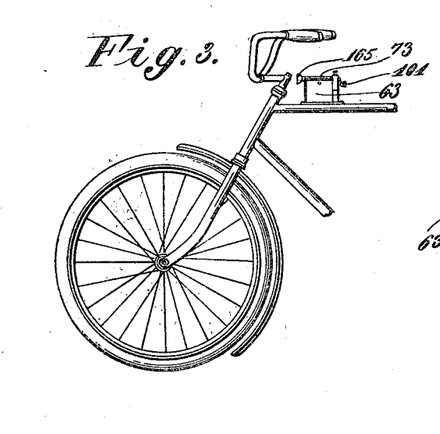
Fig. 3 is a side elevational view of the front portion of a bicycle showing the signal in an operative position thereon.
Figure 4:
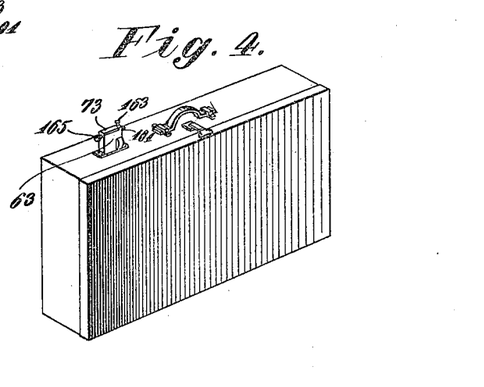
Fig. 4 is a perspective view showing a conventional type of suitcase to which the invention is applied.
Figure 5:
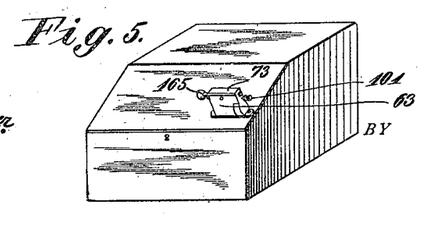
Fig. 5 is a perspective view of a desk, or the like, indicating the application of the invention.
Figure 6:
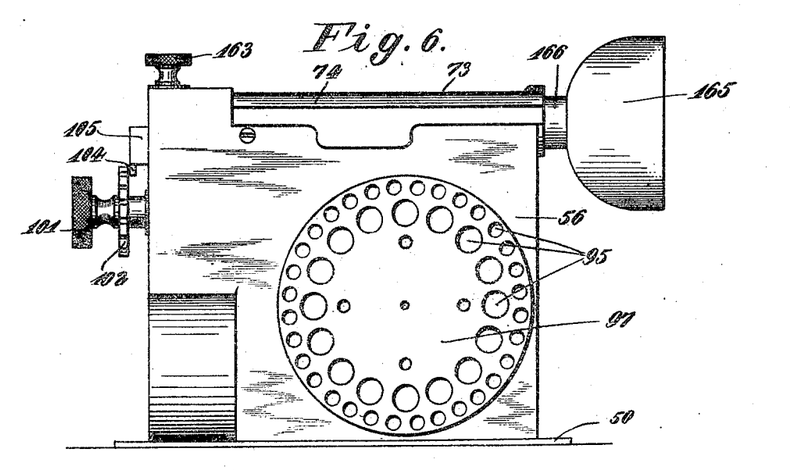
Fig. 6 is a side elevational view of the alarm signal.
Figures 7, 8:
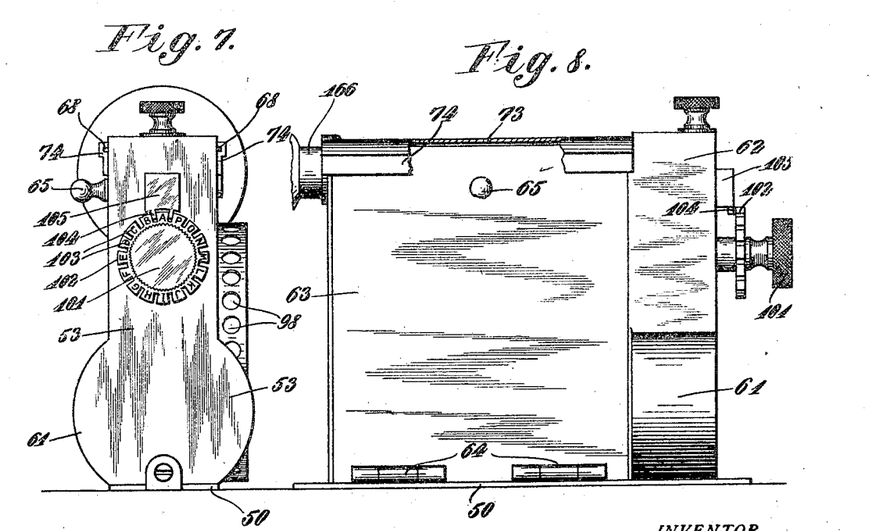
Fig. 7 is a rear end elevational view of the same.
Fig. 8 is a fragmental side view looking from the opposite side of the signal, parts being broken away to disclose the construction.
Figure 9:
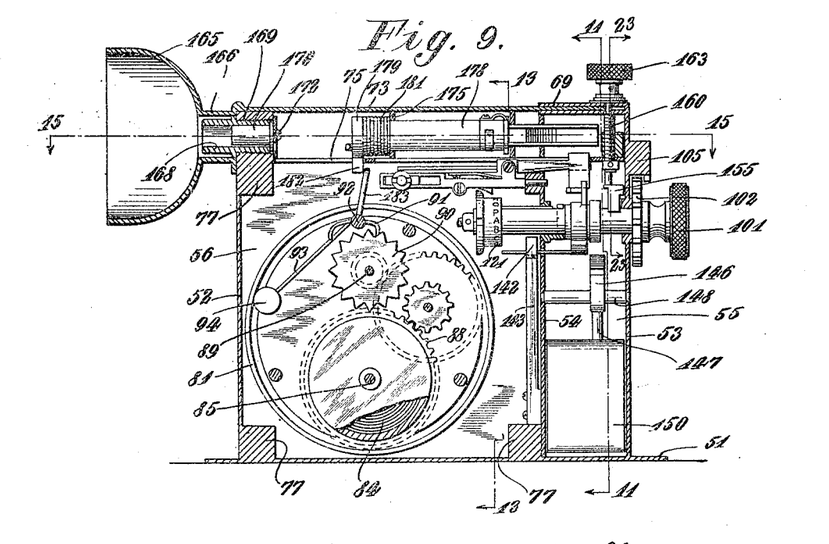
Fig. 9 is a longitudinal sectional view of the same.
Figure 10:
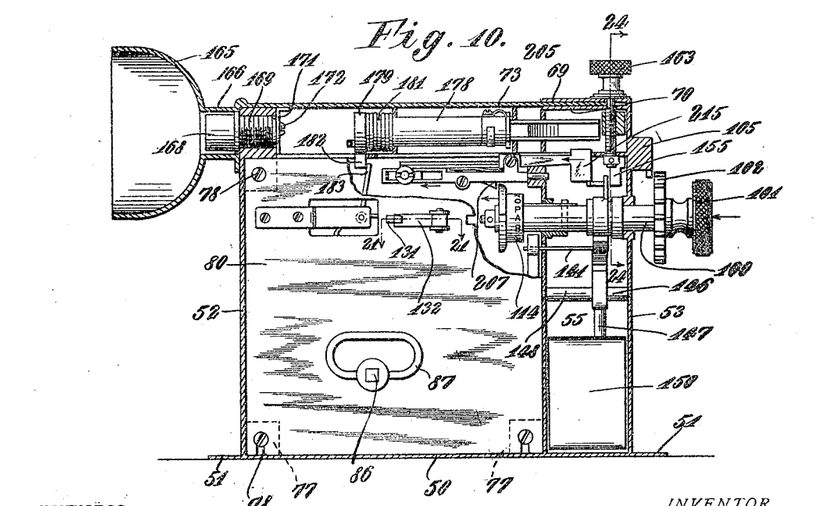
Fig. 10 is a similar sectional view taken in a different plane.
Figure 11:
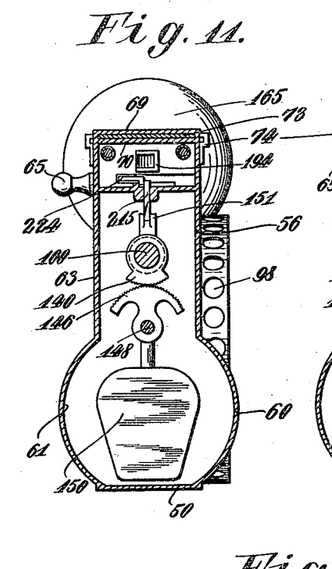
Fig. 11 is a transverse sectional view taken on line 11—11 of Fig. 9.
Figures 12, 13:
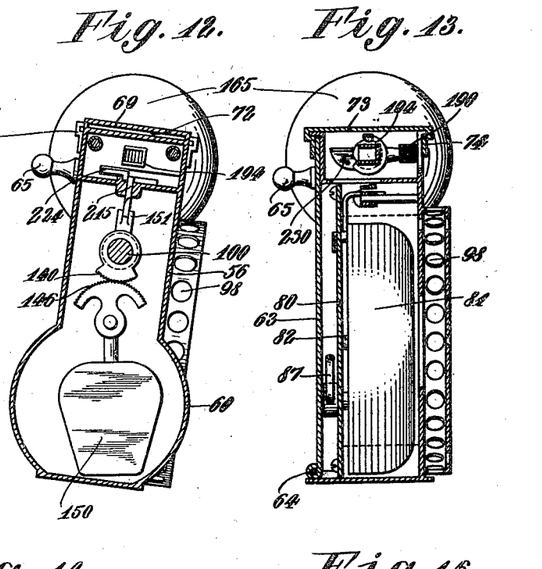
Fig. 12 is a similar view of the same indicating the parts in another position.
Fig. 13 is a similar transverse sectional view taken on line 13—13 of Fig. 9.
Figures 14, 16:
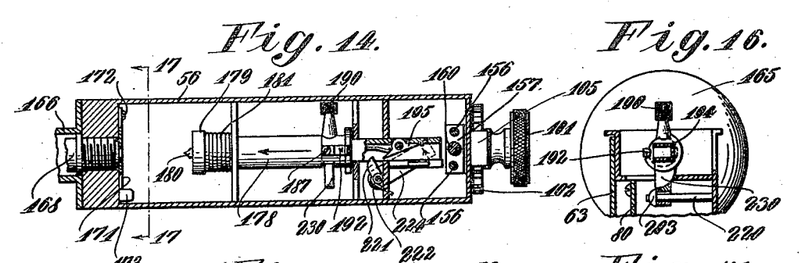
Fig. 14 is a horizontal sectional view taken on line 14—14 of Fig. 18.
Fig. 16 is a fragmental transverse sectional view taken on line 16—16 of Fig. 19.
Figures 15, 17:
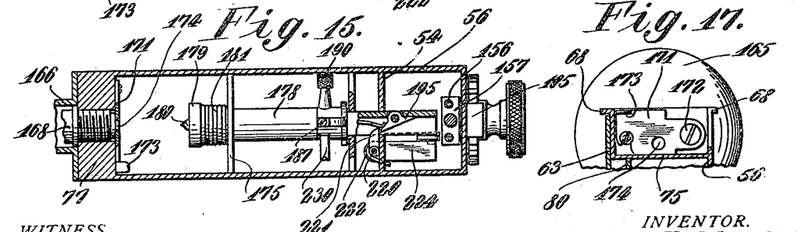
Fig. 15 is a similar horizontal sectional view taken on line 15—15 of Fig. 9.
Fig. 17 is a fragmental transverse sectional view taken on line 17—17 of Fig. 14.
Figures 18, 19, 21, 22:
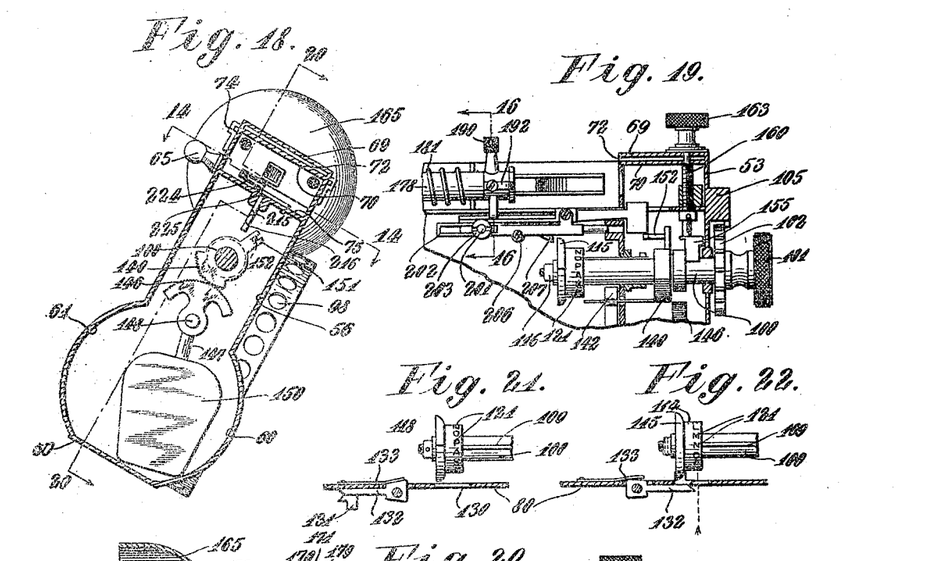
Fig. 18 is a similar view to Figs. 11 and 12 showing the parts in another position.
Fig. 19 is a fragmental vertical sectional view showing the parts in their released or operated position.
Figs. 21 and 22 are fragmental sectional views showing certain of the parts in an operative position, one reversed from the other, the sections being taken on line 21—21 of Fig. 10.

The release of the plunger 178, is attained in two different ways, one by the actuation of the knob 101, and the other by the movement of the weight 150. As has been described, the characters 103 and 121 are in correspondence at all times, the disk 115, however, is rotatable upon the spindle 100, it being effected by swinging the detent 132 into the position shown in Fig. 22, then upon rotating the knob 101, the slot 118 may be set to agree with any desired character, thus permitting the operation of the device without actuating the alarm by one familiar with the combination, which cannot be seen from the exterior.

The knob 163 is turned so as to move the block 155, up and release the spindle 100, which may now be withdrawn. The disk 102 is rotated until one of its projections, indicated by a predetermined character, enters between the projections 104.

The detent 132 is then swung into a reverse position so as to allow the disk 115, to move past and permit the segments to engage, whereupon, if the casing be moved or tipped sidewise, the pendent weight 150 acting through the segments moves the arm and allows the plate 224 to turn upon the pivot 220, releasing the detent 195, whereupon the plunger 178 will be pushed forward violently, striking the cartridge and freeing the bell mechanism so it is caused to operate.

The noise made by the cartridge is enhanced by the bell shaped cover 165, while the bell will ring until the spring mechanism has run down.

If one unfamiliar with the combination attempts to operate the knob 101, which pressed inwardly makes contact with the dog 207, pressing back the bar 202, thereby moving the plate 215, from engagement with the projection 225, so as to cause the dog 221, to release its contact with the detent 195, the same effect is attained.

If however the slot 118, in the disk 115, be in position as to clear the detent 207, the knob 101 may be pressed inwardly without affecting the setting of the apparatus.

Having thus described my invention what I claim as new and desire to secure by Letters Patent, is:—

1. In an alarm signal, the combination with a casing, a bell mounted therein and means for actuation whereof, of means receptive of a cartridge in said casing, a plunger adapted to detonate said cartridge, means combined with said plunger for liberating the actuating element of said bell, means for holding said plunger in an operative position, and means for releasing said plunger upon oscillating said casing.

2. In an alarm signal, the combination with a hollow casing, of a bell therein, means for operating said bell, means receptive of a cartridge formed in said casing, a plunger adapted to detonate the cartridge, means for propelling said plunger forward, means for holding said plunger when in a retracted position, and means for releasing said plunger coincident upon manipulating said casing.

3. In an alarm signal, the combination with a casing having a side opening, a cover hingedly engaged thereover and a slidable cover over the top of said casing, of means for locking said slidable cover in position, a cartridge receiving means in said casing, a plunger adapted to detonate said cartridge, means for engaging said plunger in an operative position, a slidable rod having characters mounted in said casing, means for rotating said rod, and means combined with said rod whereby said plunger is released.

In testimony whereof I have affixed my signature.

VLADIMIR P. FEDOROFF.